United States Patent [19]
Seifert et al.

[11] Patent Number: 5,872,520
[45] Date of Patent: Feb. 16, 1999

[54] IDENTIFICATION AND/OR SENSOR SYSTEM

[75] Inventors: Franz Seifert, Vienna; Alfred Pohl, Mistelbach; Gerald Ostermayer, Vienna, all of Austria

[73] Assignee: Siemens Aktiengesellschaft, Munich, Germany

[21] Appl. No.: 736,371

[22] Filed: Oct. 24, 1996

[30] Foreign Application Priority Data

Oct. 24, 1995 [DE] Germany .................. 195 39 506.9

[51] Int. Cl.$^6$ .............. G08B 13/14; G07D 7/00; G01S 13/74; H03H 9/00
[52] U.S. Cl. ............ 340/825.34; 340/572; 342/44; 342/51; 333/154; 333/195
[58] Field of Search ................ 340/825.34, 572; 331/18, 25, 17, 1 A, DIG. 2, 27, 16; 375/373, 376; 327/2; 329/323, 325, 50; 325/320, 419

[56] References Cited

U.S. PATENT DOCUMENTS

| 3,815,029 | 6/1974 | Wilson ........................ 325/320 |
| 4,099,125 | 7/1978 | Bennett et al. ............... 325/419 |
| 4,605,904 | 8/1986 | Hajj-Chehade ................ 329/50 |
| 4,673,932 | 6/1987 | Ekchian et al. ............ 340/825.54 |
| 5,691,698 | 11/1997 | Scholl et al. .................. 340/572 |

FOREIGN PATENT DOCUMENTS

| 42 17 049 | 11/1993 | Germany . |
| 195 10 452 | 10/1995 | Germany . |

*Primary Examiner*—Michael Horabik
*Assistant Examiner*—Jean B. Jeanglaude
*Attorney, Agent, or Firm*—Herbert L. Lerner; Laurence A. Greenberg

[57] ABSTRACT

An identification and/or sensor system includes a sensor that queries an identification and/or sensor configuration which contains resonators. A receiver receives an answer signal from the identification and/or sensor configuration. The receiver includes a phase-locked loop for converting a resonator decay signal into a signal of constant frequency and constant envelope curve.

19 Claims, 7 Drawing Sheets

IDENTIFICATION AND/OR SENSOR SYSTEM

BACKGROUND OF THE INVENTION

Field of the Invention

The present invention relates to an identification and/or sensor system having a transmitter that sends query signals by radio to an identification and/or sensor configuration, a receiver that evaluates answer signals sent back by the identification and/or sensor configuration, and resonators provided in the identification and/or sensor configuration for defining at least one parameter to be queried.

Identification and/or sensor systems of that generic type are known, for instance, from German Published, Non-Prosecuted Patent Application DE 42 17 049 A1, corresponding to U.S. application Ser. No. 08/270,931, filed Jul. 5, 1994. They are systems with passive surface wave sensors for ascertaining measured values, in which a transmit and receive device transmits energy by radio in the form of a query pulse to a sensor element contained in the surface wave sensor. Such systems are suitable for contactless measured value detection. The sensor element, which works with acoustical surface waves, and a reference element that also works with acoustical surface waves, are provided for phase discrimination and/or transit time measurements.

Such systems, which use sensor elements that work with acoustical surface waves, known as SW sensor elements, are usable for a great number of variables or parameters to be detected.

If resonators are provided in an identification and/or sensor configuration as elements that define the variables or parameters to be detected, then the answer signals decay with a time function that is defined by the energy decay time of the resonators.

SUMMARY OF THE INVENTION

It is accordingly an object of the invention to provide an identification and/or sensor system, which overcomes the hereinafore-mentioned disadvantages of the heretofore-known devices of this general type and which can convert the decay of resonators into signals of constant frequency.

With the foregoing and other objects in view there is provided, in accordance with the invention, an identification and/or sensor system, comprising a transmitter sending query signals by radio; an identification and/or sensor configuration receiving the query signals, sending answer signals and having resonators for defining at least one parameter to be queried; and a receiver evaluating the answer signals sent back by the identification and/or sensor configuration, the receiver having a scanned phase-locked loop triggered by the answer signal, the phase-locked loop having a sample and hold circuit, and the receiver having a threshold value detector triggering the sample and hold circuit.

In accordance with another feature of the invention, the threshold value detector supplies an output signal dependent on a level of an input signal, and the sample and hold circuit is triggered by the output signal of the threshold value detector.

In accordance with a further feature of the invention, there is provided a counter coupled to an output of the phase-locked loop.

In accordance with an added feature of the invention, there is provided a mixer connected upstream of the phase-locked loop.

In accordance with an additional feature of the invention, there is provided a computer, and a synthesizer controlled by the computer and connected to the mixer for delivering a signal to be mixed with the query signal.

In accordance with yet another feature of the invention, the computer is connected to the counter, and the synthesizer is controlled by the computer as a function of frequency information furnished by the counter.

In accordance with yet a further feature of the invention, the computer adjusts a frequency of the query signal in the transmitter.

In accordance with yet an added feature of the invention, the phase-locked loop has a voltage-controlled oscillator and a phase detector, and the phase detector is a ring mixer with a phase detector constant defined by a product of amplitudes of the input signal and of a signal of the voltage-controlled oscillator.

In accordance with yet an additional feature of the invention, there is provided a stage connected upstream of the phase-locked loop for keeping an amplitude of a phase-locked loop input signal constant.

In accordance with again another feature of the invention, the stage for keeping the amplitude constant is a limiter amplifier or a logarithmic amplifier.

In accordance with again a further feature of the invention, the phase-locked loop has a phase detector, a reversing switch downstream of the sample and hold circuit, a voltage-controlled oscillator and a loop filter having an output coupled through the sample and hold circuit to the voltage-controlled oscillator and coupled directly through the reversing switch to the voltage-controlled oscillator; and the threshold value detector is an asynchronous detector furnishing two threshold value signals for variously high input signal levels, one of the output signals represents a high input signal level and couples the sample and hold circuit to an output of the phase detector, and another of the output signals represents a low input signal level coupling the loop filter to the output of the phase detector, directly through the reversing switch or through the sample and hold circuit.

In accordance with again an added feature of the invention, there is provided a reversing switch, another phase-locked loop with a sample and hold circuit, the two phase-locked loops having outputs coupled to the reversing switch, a sample control circuit downstream of the threshold value detector for furnishing two sample control signals for triggering the sample and hold circuits, and the output signal of one of the phase-locked loops triggering the reversing switch.

In accordance with again an additional feature of the invention, the phase-locked loop has a voltage-controlled oscillator, and there is provided an analog/digital converter converting a control voltage of the voltage-controlled oscillator into a digital signal as a function of the output signal of the threshold value detector triggering the sample and hold circuit of the phase-locked loop.

In accordance with still another feature of the invention, the voltage-controlled oscillator is an oscillator with low phase noise.

In accordance with still a further feature of the invention, there is provided a transmit/receive switch, a shunt branch connected parallel to the transmit/receive switch, and a computer controlling the transmit/receive switch and the shunt branch, the phase-locked loop having a phase detector and a single voltage-controlled oscillator belonging to both the transmitter and the receiver, the voltage-controlled oscillator having an output coupled through the transmit/receive switch and through the shunt branch to the phase detector.

In accordance with still an added feature of the invention, the shunt branch includes a shunt switch, a phase correction circuit coupled to the shunt switch, and a damping circuit coupled to the phase correction circuit.

In accordance with still an additional feature of the invention, there is provided an amplifier coupling the voltage-controlled oscillator to the transmit/receive reversing switch and to the shunt branch.

In accordance with another feature of the invention, the shunt branch is a further phase-locked loop.

In accordance with a further feature of the invention, there is provided a detector circuit triggered by the phase detector in the phase-locked loop for detecting a locked-in state of the phase-locked loop, and a signal generator triggered by the detector circuit for varying a frequency of the voltage-controlled oscillator, the voltage-controlled oscillator being turned off by the detector circuit upon detection of the locked-in state of the phase-locked loop.

In accordance with an added feature of the invention, there is provided a loop filter connected upstream of the detector circuit.

In accordance with an additional feature of the invention, the phase-locked loop is a digital closed control loop.

In accordance with a concomitant feature of the invention, the phase-locked loop has a numerical controlled oscillator and further components, and there is provided a control computer in which the further components of the phase-locked loop and control functions are integrated.

Other features which are considered as characteristic for the invention are set forth in the appended claims.

Although the invention is illustrated and described herein as embodied in an identification and/or sensor system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
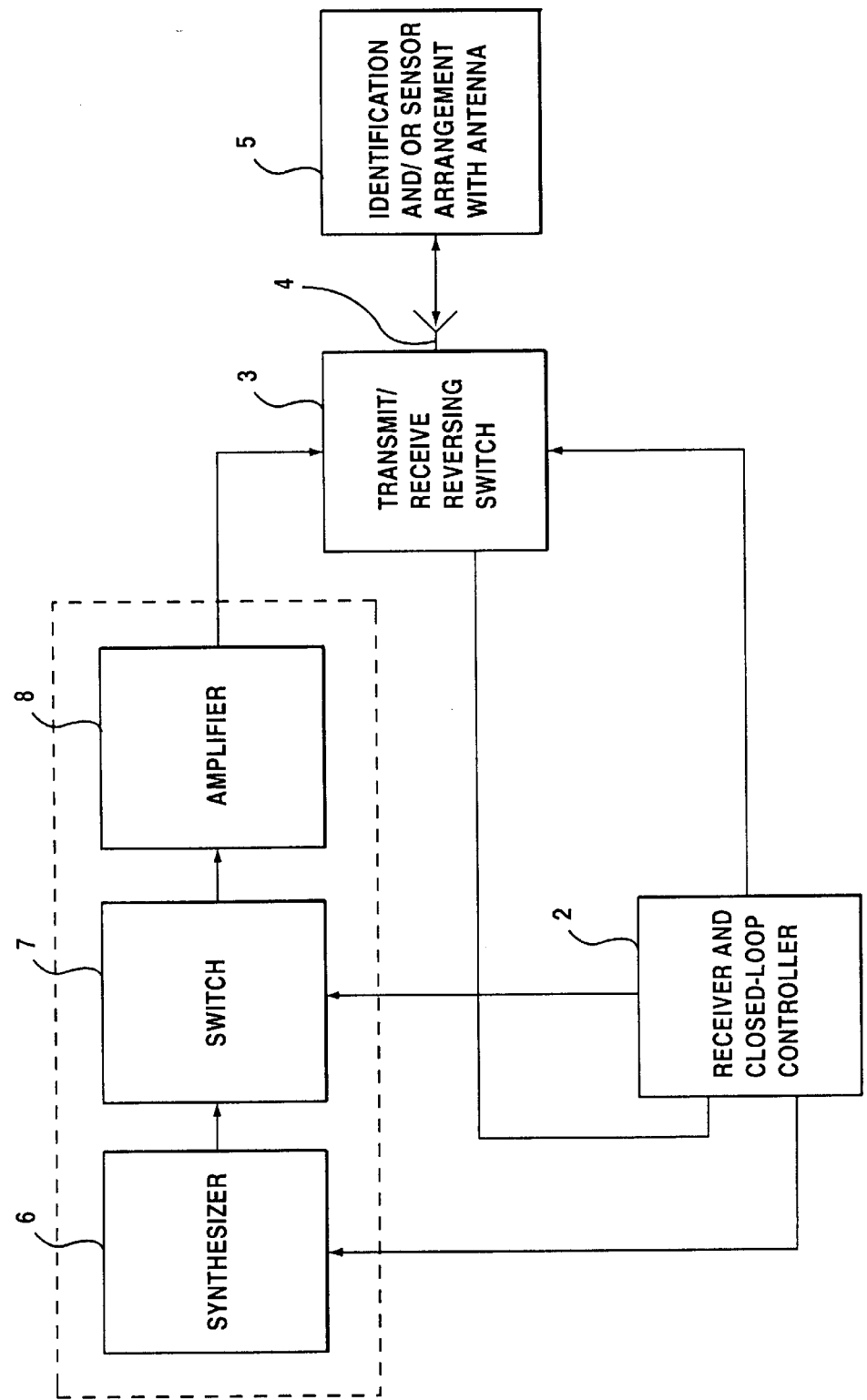
FIG. 1 is a block circuit diagram of a general layout of an identification and/or sensor system according to the invention.

Referring now to the figures of the drawings in detail and first, particularly, to FIG. 1 thereof, there is seen an identification and/or sensor system according to the invention which in general includes a transmitter 1 as well as a receiver and closed-loop controller 2 that are coupled through a transmit/receive reversing switch 3 to an antenna 4. A frequency signal is sent by the transmitter 1 through the transmit/receive reversing switch 3 and the antenna 4 to an identification and/or sensor configuration 5 with an antenna. The identification and/or sensor configuration 5 sends an answer signal back through the antenna 4 and the transmit/receive reversing switch 3 to the receiver and controller 2 as a function of the frequency signal.

The transmitter 1 includes a frequency synthesizer 6, which is triggered by the receiver and controller 2 and is coupled to the transmit/receive reversing switch 3 through a switch 7 and an amplifier 8. The switch 7 is triggered by the receiver and controller 2, and it switches the frequency synthesizer for transmitting the frequency signal through the amplifier 8 to the transmit/receive reversing switch 3, which is switched over to transmission or reception by the receiver and controller 2.

As already mentioned, in the case of resonators answer signals decay or fade in accordance with a time function that is defined by the energy decay in the resonators. In order to convert this decay into signals of equal frequency and constant amplitude of the envelope curve that is also available after the sensor answer fades, the receiver includes a phase-locked loop that is scanned by the answer signal and also includes a threshold value detector that triggers a sample and hold circuit in the phase-locked loop and is triggered by the answer signal.

Figure 2:
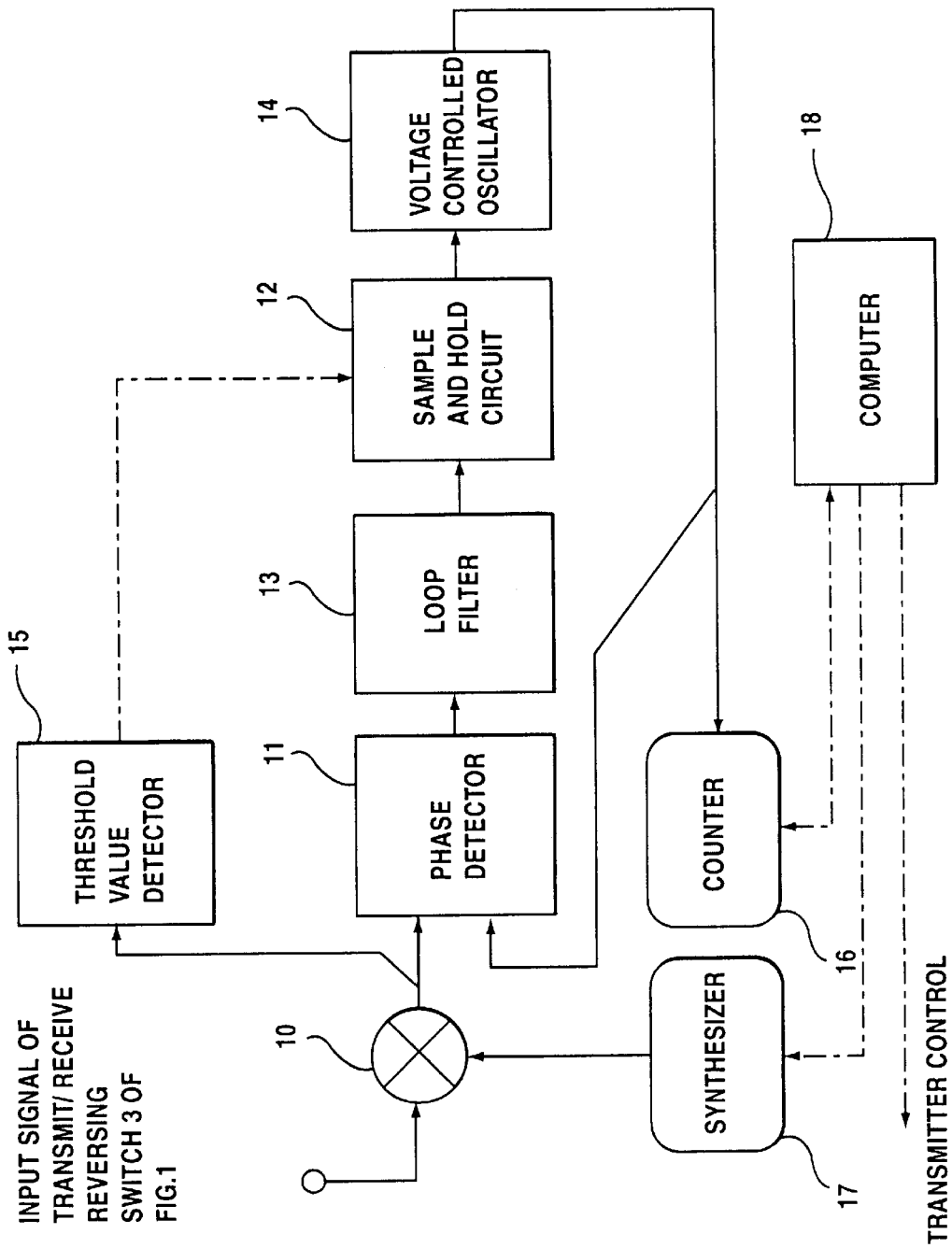
FIGS. 2–6 are block circuit diagrams each showing one embodiment of a receiver of an identification and/or sensor system according to the invention.

A first embodiment of a receiver is shown in FIG. 2. A phase-locked loop includes a phase detector 11, a sample and hold circuit 12, a loop filter 13 and a voltage-controlled oscillator 14, which is fed back to the phase detector 11. The phase detector 11 may be a ring mixer, having a phase detector constant which is defined by the product of the amplitude of an input signal and of a signal of the voltage-controlled oscillator 14. An intervention into the properties of the receiver is thus possible. The exponential fading of the input signal can be compensated for by keeping the product of the two amplitudes constant. An input signal from the transmit/receive reversing switch 3 of FIG. 1 is input into a mixer 10, in which it is mixed with a signal from a frequency synthesizer 17 to form a signal of a suitable frequency for the phase-locked loop 11–14. An output signal of the mixer 10 with an adequate signal-to-noise ratio is ascertained by a threshold value detector 15, which triggers the sample and hold circuit 12 in the phase-locked loop 11–14. If a mixture output signal with an adequate signal-to-noise ratio is present, then the phase-locked loop is closed, and the voltage-controlled oscillator 14 is synchronized with the input signal within only a few periods.

Dynamic behavior as well as allowable frequency deviations are determined, in accordance with a further characteristic of the invention, by the loop filter 13.

If the input signal drops below the threshold value signal level of the threshold value detector 15 or vanishes, then the phase-locked loop 11–14 is opened through the sample and hold circuit 12, so that the voltage-controlled oscillator 14 oscillates freely, as a function of the control voltage furnished by the sample and hold circuit 12.

In the case of cyclical querying, the output signal of the voltage-controlled oscillator 14 is readjusted periodically to the frequency and phase of the resonator answer signal, with its amplitude remaining the same.

The frequency of the output signal of the voltage-controlled oscillator 14 can be determined very accurately by counting out over long periods, through the use of a counter 16.

According to a further feature of the invention, computer control is provided through the use of a computer 18, which receives the frequency information from the counter and controls not only the frequency synthesizer 17 but also the query signal and the transmitter 1 of FIG. 1. This involves adaptive readjustment of the frequency signal and of the frequency of the synthesizer 17 and optionally the duration and amplitude of the frequency signal and thus its energy and bandwidth. In a first frequency cycle with short frequency pulses, a broad frequency range can be investigated. After the measurement of a resonator answer signal, the resonator is acted upon by broader narrow-band frequency signals with the highest possible pump energy, so that it can be determined very accurately in its decay frequency. If the frequency energy remains constant, then the transmitting power output can be reduced by reducing the signal bandwidth.

Another embodiment enabled by the computer control is a narrow-band resonator query in the event of frequency drift by varying the measured value, with only slight influence from other resonators.

In order to provide appropriate use of a restricted dynamic range of the phase-locked loop 11–14, a ring mixer may be provided according to a further feature of the invention, in the form of the phase detector 11, with which the phase detector constant can be varied through the use of the product of the amplitudes of the input signal and a local oscillator, and control can be effected by the amplitude of the oscillator 14.

Figure 3:
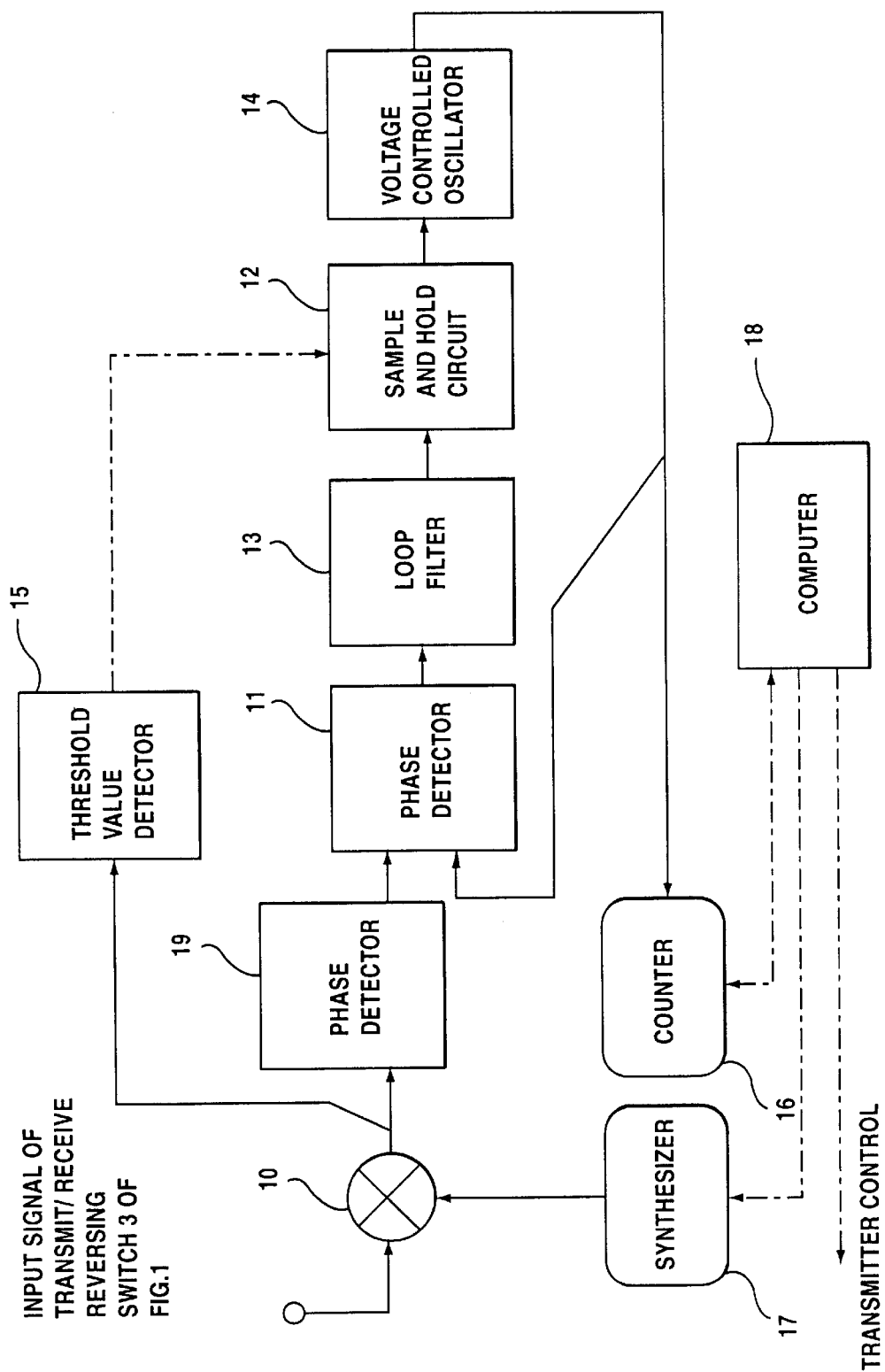

In another embodiment of a receiver of an identification and/or sensor system according to the invention as shown in FIG. 3, in which the same elements as in FIG. 2 are provided with the same reference numerals, the phase detector 11 is preceded by an amplifier 19, so that the amplitude can be kept constant with minimal distortion of the signal phase. This amplifier 19 may be constructed as a limiter amplifier or a logarithmic amplifier. Due to this amplifier 19, the signal amplitude at the input to the phase-locked loop 11–14 has approximately constant amplitude over the entire dynamic range, which is typically from 50 to 100 dB, and as a result influence on the phase-locked loop is precluded. The mode of operation of the embodiment of FIG. 3 is otherwise equivalent to the mode of operation of the embodiment of FIG. 2 and therefore need not be explained in detail again herein.

Figure 4:
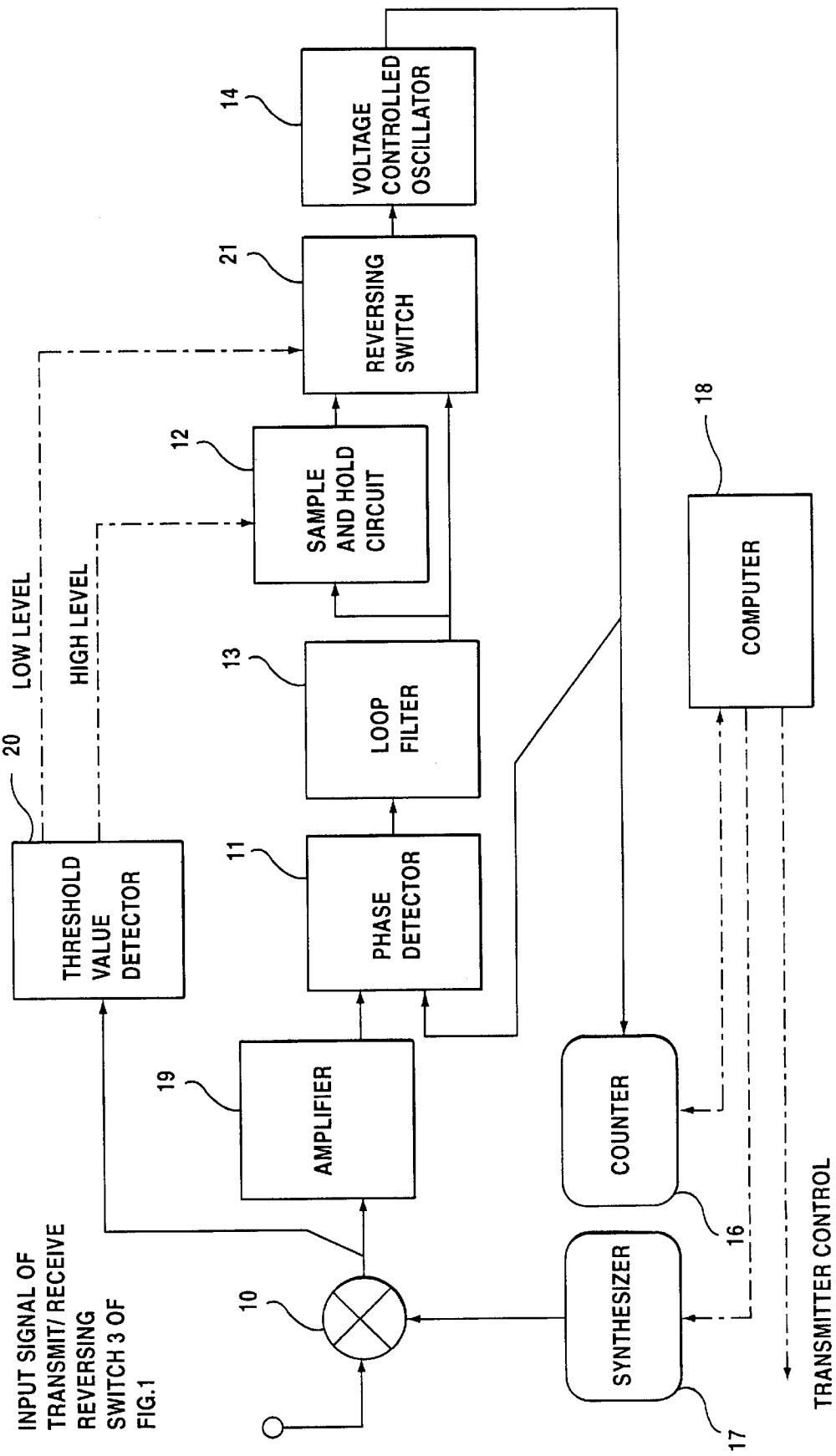

Another embodiment of a receiver of an identification and/or sensor system according to the invention is shown in FIG. 4, in which elements identical to those of FIGS. 2 and 3 are provided with the same reference numerals. In this embodiment, a threshold value detector 20, triggered by the mixer output signal, is constructed as an adaptive detector, which furnishes two threshold value signals of variously high level, which are identified in FIG. 4 as "low level" and "high level". A reversing switch 21 which is triggered by the threshold value detector 20 is coupled to the phase detector 11 both through the sample and hold circuit 12 and directly. Only steady-state signals are then present at the input to the loop filter 13 and thus also at the input to the voltage-controlled oscillator 14. If a signal of adequately high level is present at the output of the mixer 10 and thus at the input to the threshold value detector 20, then the threshold value detector 20 furnishes the output signal for a high input signal level, and as a result the sample and hold circuit 12 is switched to sampling mode, and the reversing switch 21 is connected directly to the output of the phase detector 11. The phase-locked loop is thus locked in.

If the signal level at the output of the mixer and thus at the input to the threshold value detector 20 drops, then the latter furnishes the output signal for a low input signal level, and as a result the sample and hold circuit switches over to the holding mode, and the reversing switch 21 couples the holding signal of the sample and hold circuit 12 to the loop filter 13.

Figure 5:
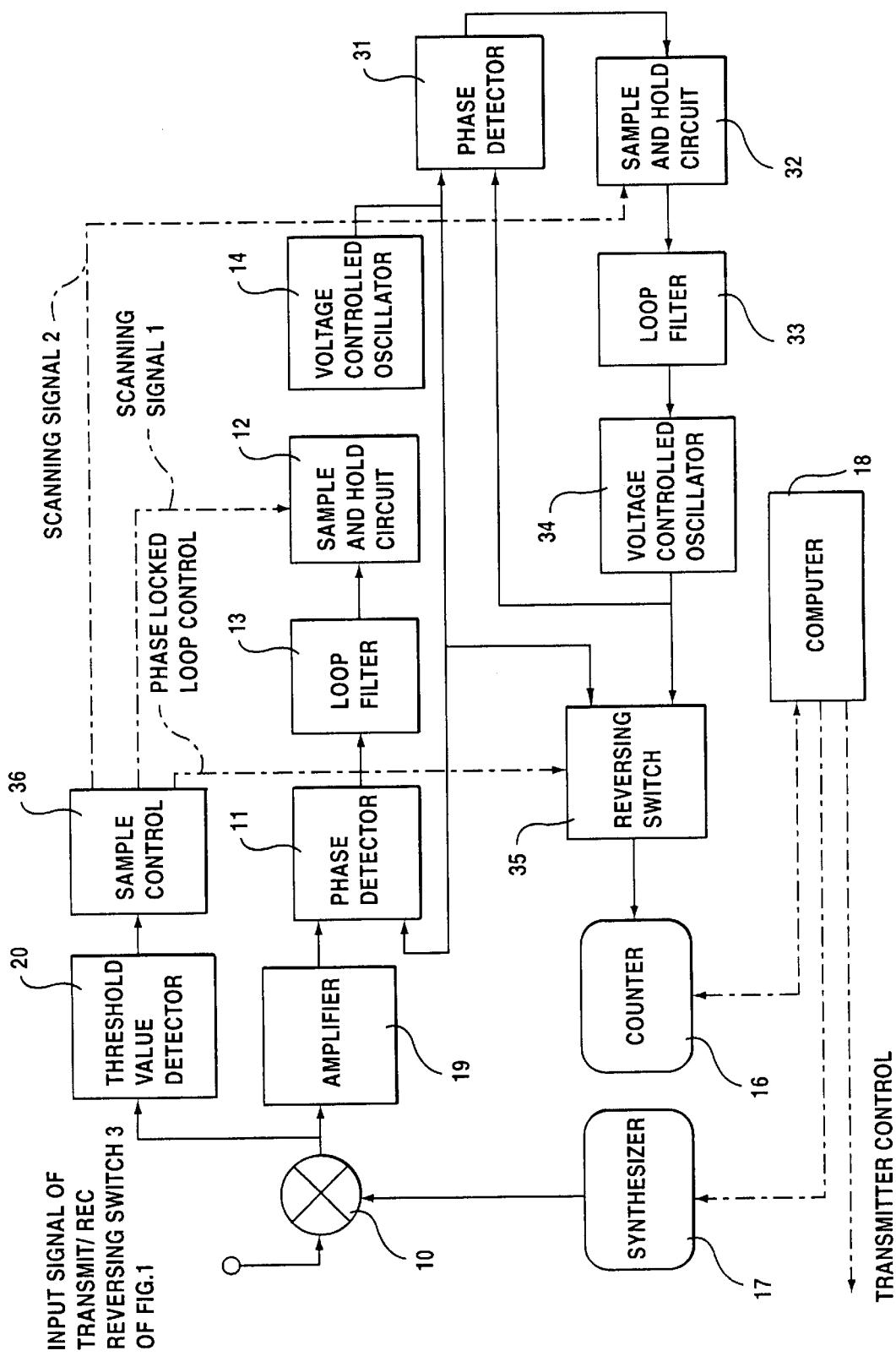

Another embodiment of a receiver for an identification and/or sensor system according to the invention is shown in FIG. 5, in which elements identical to those of FIGS. 2–4 are provided with the same reference numerals. In this embodiment, the phase-locked loop having the elements 11, 12, 13, 14 and a phase-locked loop having elements 31, 32, 33, 34 are provided. Outputs of the two phase-locked loops 11–14 and 31–34 are coupled to a reversing switch 35. A threshold value detector 20 coupled to the output of the mixer 10, like the threshold value detector 20 of FIG. 4, furnishes two threshold value signals for variously high levels of the input signal. The output of this threshold value detector 20 is coupled to a sample control 36, which operates as a function of the threshold value signals of the threshold value detector 20 to furnish one scanning signal 1 for the phase-locked loop 11–14 and one scanning signal 2 for the phase-locked loop 31–34. This sample control also furnishes a PLL control signal for the reversing switch 35, as a result of which either the phase-locked loop 11–14 or the phase-locked loop 31-34 is coupled to the counter 16.

If a signal with an adequately high level is present at the output of the mixer 10, then the phase-locked loop 11–14 is synchronized to that signal. If this phase-locked loop 11–14 switches over to the holding mode, then the phase-locked loop 31–34 is synchronized to the frequency and phase of the stably oscillating voltage-controlled oscillator 14 of the phase-locked loop 11–14. The input of the counter 16 alternatingly receives a signal from whichever phase-locked loop is operating with stable frequency in the holding mode.

Figure 6:
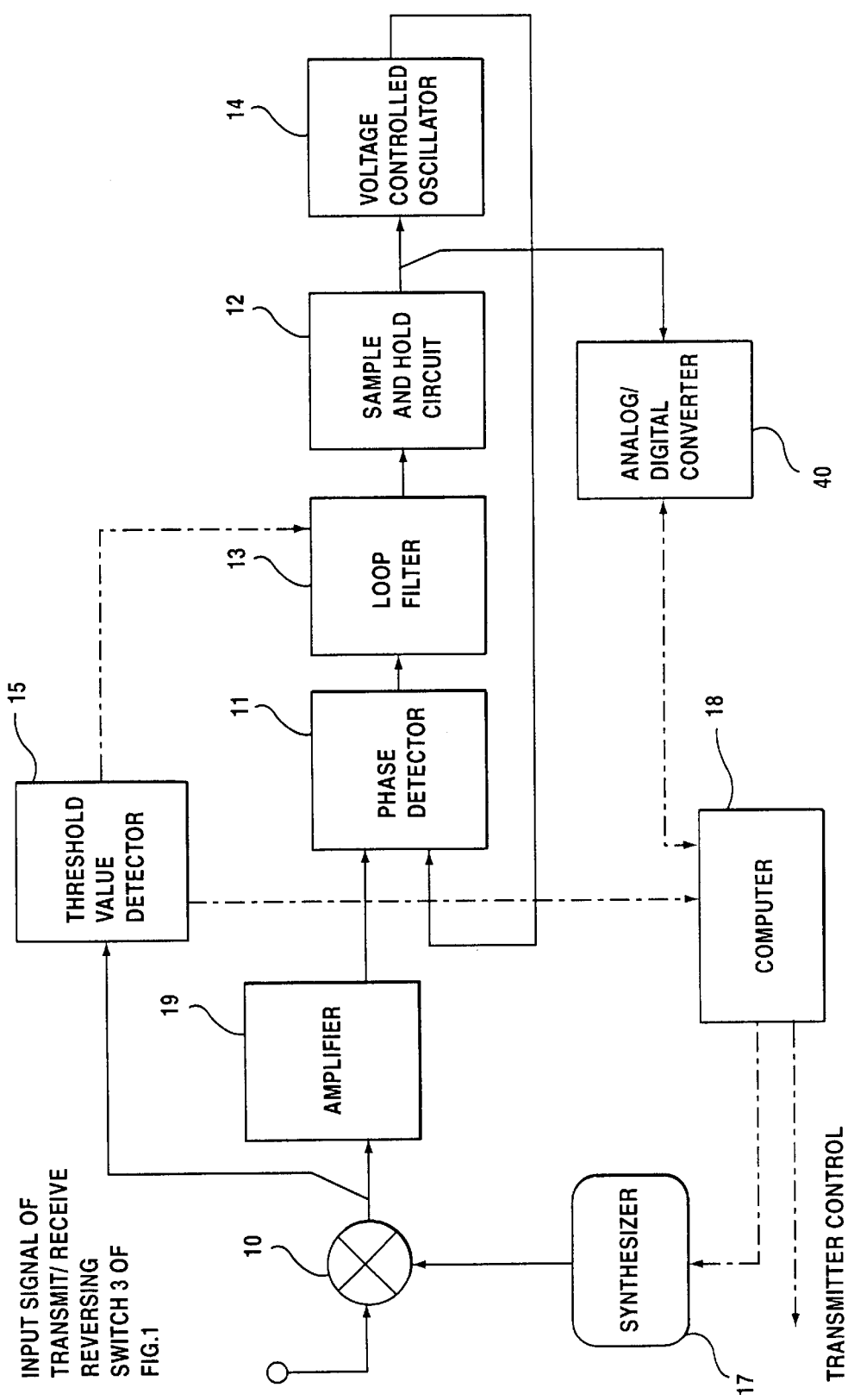

Another embodiment of a receiver of an identification and/or sensor system according to the invention, which is shown in FIG. 6 and in which elements identical to those of FIG. 2 are provided with the same reference numerals, offers an alternative to the frequency measurement of the voltage-controlled oscillator 14. This receiver functions in the same way as the receiver of FIG. 3, with the synchronization of the voltage-controlled oscillator 14 to the answer signal of resonators in the identification and/or sensor configuration 5 of FIG. 1. In this receiver, an analog/digital converter (ADC) 40 is coupled to the output of the loop filter 13 and converts the control voltage for the voltage-controlled oscillator 14 into a digital value. The measurement is effected in the locked-in state of the phase-locked loop 11–14, so that the long-term stability of the oscillator affects only the transient response in resynchronization, but not the accuracy of measurement. This accuracy is determined solely by the precision of the analog/digital converter 40 and by the phase noise of the voltage-controlled oscillator 14. In accordance with a special feature of the invention, an oscillator with low phase noise is therefore provided as the voltage-controlled oscillator 14.

Figure 7:
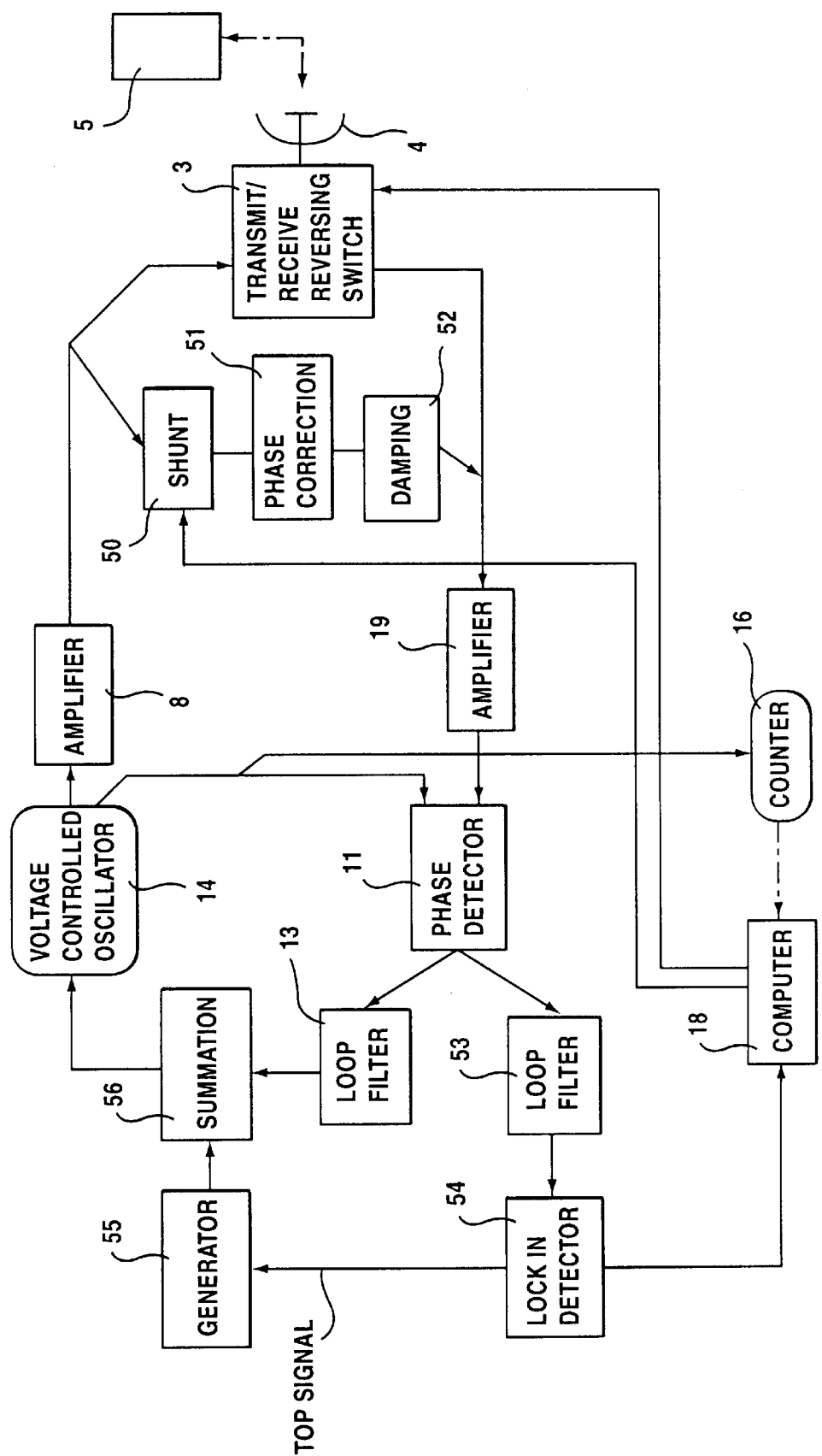
FIG. 7 is a block circuit diagram for a combined transmitter/receiver of an identification and/or sensor system according to the invention.

FIG. 7 shows an embodiment of an identification and/or sensor system according to the invention in which the transmitter and receiver are not separate components. The voltage-controlled oscillator 14 is coupled through the amplifier 8 both to the transmit/receive reversing switch 3 which is controlled by the computer 18 and to a shunt branch 50, 51, 52 that is located parallel to the switch 3 and is controlled by the computer 18. The shunt branch includes a shunt switch 50, a phase correction circuit 51 downstream thereof and a damping circuit 52 downstream of the phase correction circuit. The two branches are coupled through the amplifier 19 to the phase detector 11, which in turn is coupled to the loop filter 13. The phase detector 11 is also coupled to a further loop filter 53, which is coupled through a lock-in detector 54, a generator 55 and a summation circuit 56, to the voltage-controlled oscillator 14. The summation circuit 56 is also connected to the loop filter 13. In the steady or in other words locked-in state, the transmit/receive reversing switch 3 and the shunt switch 50 are connected in alternation. The frequency signal for the resonator and identification and/or sensor configuration 5 is generated through the transmit/receive reversing switch 3 and the antenna 4. After switchover of the parallel branches, the answer signal from the configuration 5 is received through the transmit/receive reversing switch 3 which is switched for reception. The assumption is a frequency period so brief that during reception, a signal reflected back from the configuration 5 always arrives at the transmit/receive reversing switch 3. Upon this condition, resynchronization can be carried out in the continuously locked-in state of the phase-locked loop, even though a signal of suitable frequency is available in the intervals between transmissions. In the locked-in state, the oscillation frequency of the voltage-controlled oscillator 14 is equal to the natural frequency of the resonator, so that the transmission signal for steady-state events can be used as a reference signal. This signal is coupled into the phase-locked loop through the shunt switch 50, the phase correction circuit 51 and the damping circuit 52. The phase correction circuit 51 brings about a frequency-dependent phase delay in the feedback of the querying transmission signal and therefore prevents the voltage-controlled oscillator 14 from drifting away in the transmission mode.

Instead of the illustrated shunt branch 50, 51, 52, a scanned phase-locked loop of the kind present in the embodiments of FIGS. 2–6, can also be provided, in accordance with a further feature of the invention.

In the non-locked-in state, no reference signal is present when answer signals are looked for in the intervals between transmissions, so that depending on the system parameters, it is possible that no locking-in of the phase-locked loop will occur. This problem is solved by a combination of a circuit for detecting the locked-in state from the output signal of the phase detector 11 and a circuit for changing the initial frequency of the voltage-controlled oscillator 14. The locked-in state is detected by the lock-in detector 54, which is triggered through the loop filter 53. The starting value of the output frequency of the voltage-controlled oscillator 14 is raised in increments, through the generator 55 and the summation circuit 56, until the lock-in detector 54 signals the locked-in state of the phase-locked loop and thus signals that the configuration 5 containing resonators has been found.

According to a further non-illustrated feature of the invention, the phase-locked loop in the above-described embodiments may be constructed as a digital phase-locked loop. A numerically controlled oscillator is then used as the oscillator, instead of a voltage-controlled oscillator. The phase detector, the loop filter and all of the control functions are integrated into the control computer 18.

We claim:

1. An identification and/or sensor system, comprising:
   a transmitter sending query signals by radio;
   an identification and/or sensor configuration receiving the query signals, sending answer signals and having resonators for defining at least one parameter to be queried;
   a receiver evaluating the answer signals sent back by said identification and/or sensor configuration, said receiver having a scanned phase-locked loop triggered by the answer signal, said phase-locked loop having a sample and hold circuit, and said receiver having a threshold value detector triggering said sample and hold circuit;
   said phase-locked loop also having a phase detector, a reversing switch downstream of said sample and hold circuit, a voltage-controlled oscillator and a loop filter having an output coupled through said sample and hold circuit to said voltage-controlled oscillator and coupled directly through said reversing switch to said voltage-controlled oscillator; and
   said threshold value detector is an asynchronous detector furnishing two threshold value output signals for variously high input signal levels, one of the output signals represents a high input signal level and couples said sample and hold circuit to an output of said phase detector, and another of the output signals represents a low input signal level coupling said loop filter to the output of said phase detector, directly through said reversing switch or through said sample and hold circuit.

2. The identification and/or sensor system according to claim 1, including a counter coupled to an output of said phase-locked loop.

3. The identification and/or sensor system according to claim 2, including a computer connected to said counter, and a synthesizer controlled by said computer as a function of frequency information furnished by said counter, said synthesizer being connected to said mixer for delivering a signal to be mixed with the query signal.

4. The identification and/or sensor system according to claim 1, including a mixer connected upstream of said phase-locked loop.

5. The identification and/or sensor system according to claim 4, including a computer, and a synthesizer controlled by said computer and connected to said mixer for delivering a signal to be mixed with the query signal.

6. The identification and/or sensor system according to claim 5, wherein said computer adjusts a frequency of the query signal in said transmitter.

7. The identification and/or sensor system according to claim 1, wherein said phase detector is a ring mixer with a phase detector constant defined by a product of amplitudes of the input signal and of a signal of said voltage-controlled oscillator.

8. The identification and/or sensor system according to claim 1, including a stage connected upstream of said phase-locked loop for keeping an amplitude of a phase-locked loop input signal constant.

9. The identification and/or sensor system according to claim 8, wherein said stage for keeping the amplitude constant is limiter amplifier.

10. The identification and/or sensor system according to claim 8, wherein said stage for keeping the amplitude constant is a logarithmic amplifier.

11. An identification and/or sensor system, comprising:
    a transmitter sending query signals by radio;
    an identification and/or sensor configuration receiving the query signals, sending answer signals and having resonators for defining at least one parameter to be queried;
    a receiver evaluating the answer signals sent back by said identification and/or sensor configuration, said receiver having a scanned phase-locked loop triggered by the answer signal, said phase-locked loop having a sample and hold circuit, and said receiver having a threshold value detector triggering said sample and hold circuit; and a reversing switch, another phase-locked loop with a sample and hold circuit, said two phase-locked loops having outputs coupled to said reversing switch, a sample control circuit downstream of said threshold value detector for furnishing two sample control signals for triggering said sample and hold circuits, and the output signal of one of said phase-locked loops triggering said reversing switch.

12. An identification and/or sensor system, comprising:

a transmitter sending query signals by radio;

an identification and/or sensor configuration receiving the query signals, sending answer signals and having resonators for defining at least one parameter to be queried;

a receiver evaluating the answer signals sent back by said identification and/or sensor configuration, said receiver having a scanned phase-locked loop triggered by the answer signal, said phase-locked loop having a sample and hold circuit, and said receiver having a threshold value detector triggering said sample and hold circuit; and a transmit/receive switch, a shunt branch connected parallel to said transmit/receive switch, and a computer controlling said transmit/receive switch and said shunt branch, said phase-locked loop having a phase detector and a single voltage-controlled oscillator belonging to both said transmitter and said receiver, said voltage-controlled oscillator having an output coupled through said transmit/receive switch and through said shunt branch to said phase detector.

13. The identification and/or sensor system according to claim 12, wherein said shunt branch includes a shunt switch, a phase correction circuit coupled to said shunt switch, and a damping circuit coupled to said phase correction circuit.

14. The identification and/or sensor system according to claim 12, including an amplifier coupling said voltage-controlled oscillator to said transmit/receive reversing switch and to said shunt branch.

15. The identification and/or sensor system according to claim 12, wherein said shunt branch is a further phase-locked loop.

16. The identification and/or sensor system according to claim 12, including a detector circuit triggered by said phase detector in said phase-locked loop for detecting a locked-in state of said phase-locked loop, and a signal generator triggered by said detector circuit for varying a frequency of said voltage-controlled oscillator, said voltage-controlled oscillator being turned off by said detector circuit upon detection of the locked-in state of said phase-locked loop.

17. The identification and/or sensor system according to claim 16, including a loop filter connected upstream of said detector circuit.

18. The identification and/or sensor system according to claim 1, wherein said phase-locked loop is a digital closed control loop.

19. The identification and/or sensor system according to claim 18, wherein said phase-locked loop has a numerical controlled oscillator and further components, and including a control computer in which said further components of said phase-locked loop and control functions are integrated.

* * * * *